US010360860B2

(12) United States Patent
Chen

(10) Patent No.: US 10,360,860 B2
(45) Date of Patent: Jul. 23, 2019

(54) OVERDRIVE METHOD OF FOUR-COLOR PANEL

(71) Applicant: Shenzhen China Star Optoelectronics Technology Co., Ltd., Shenzhen, Guangdong (CN)

(72) Inventor: Lixuan Chen, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 312 days.

(21) Appl. No.: 15/500,108

(22) PCT Filed: Jan. 18, 2017

(86) PCT No.: PCT/CN2017/071485
§ 371 (c)(1),
(2) Date: Jan. 30, 2017

(87) PCT Pub. No.: WO2018/040486
PCT Pub. Date: Mar. 8, 2018

(65) Prior Publication Data
US 2019/0005900 A1    Jan. 3, 2019

(30) Foreign Application Priority Data
Aug. 31, 2016    (CN) .......................... 2016 1 0784274

(51) Int. Cl.
*G02F 1/13* (2006.01)
*G09G 3/36* (2006.01)

(52) U.S. Cl.
CPC .............. *G09G 3/3607* (2013.01); *G02F 1/13* (2013.01); *G09G 3/36* (2013.01); *G09G 2320/0257* (2013.01); *G09G 2360/16* (2013.01)

(58) Field of Classification Search
None
See application file for complete search history.

(56) References Cited

U.S. PATENT DOCUMENTS

| | | | |
|---|---|---|---|
| 2005/0083353 A1* | 4/2005 | Maruyama ........... | G09G 3/3611 345/690 |
| 2013/0010014 A1* | 1/2013 | Hasegawa ............ | G09G 3/3607 345/690 |
| 2015/0116374 A1* | 4/2015 | Shin ...................... | G09G 3/003 345/690 |
| 2016/0247427 A1* | 8/2016 | Fan ......................... | G09G 3/36 |

* cited by examiner

*Primary Examiner* — Amare Mengistu
*Assistant Examiner* — Sarvesh J Nadkarni

(57) ABSTRACT

An overdrive method of a four-color panel is disclosed. The method comprises searching 10% brightness value point and 90% brightness value point in a normalized curve, calculating difference between R (or B) brightness normalized curve and G brightness normalized curve ranging from 10% brightness value point to 90% brightness value point, and determining each R/G overdrive gray-scale voltage value in an overdrive gray-scale voltage table through evaluating a minimum value of the difference between brightness normalized curves. The obtained changed R/G/B overdrive target values are substituted into a formula for calculating W overdrive target value between different gray-scales.

20 Claims, 5 Drawing Sheets

OVERDRIVE METHOD OF FOUR-COLOR PANEL

CROSS-REFERENCE TO RELATED APPLICATIONS

This application claims the priority of Chinese patent application CN 201610784274.3, entitled "Overdrive method of four-color panel" and filed on Aug. 31, 2016, the entirety of which is incorporated herein by reference.

FIELD OF THE INVENTION

The present disclosure relates to an overdrive method of a four-color panel.

BACKGROUND OF THE INVENTION

Liquid crystal display (LCD) devices have been widely used because they are characteristically thin, power-saving, and nonradiative. LCD devices currently on the market are mainly backlight ones which each usually comprises an LCD panel and a backlight module. The LCD panel is provided with two glass substrates and a liquid crystal material sandwiched between the two glass substrates. By applying a drive voltage on the two glass substrates, directions of molecules in the liquid crystal material are controlled and light from the backlight module can thus be reflected to produce images.

Response time of liquid crystals is a significant parameter for evaluating the quality of an LCD device. According ISO13406-2, when a pixel changes from white to black, the voltage on the pixel electrode changes from zero to its maximum value, and driven by this maximum voltage, liquid crystal molecules orient themselves quickly to new positions (the duration of this process is called rise time); and when a pixel changes from black to white, the voltage on the pixel electrode is cut off, and liquid crystal molecules return to their original positions before the voltage was applied (the duration of this process is called fall time). The response time of liquid crystal molecules is the sum of the rise time and the fall time. From the perspective of grayscale, response time is actually the deflection speed of liquid crystal molecules. There are generally three methods to enhance the deflection speed of liquid crystal molecules.

1. The first method is to increase the drive voltage. Deflection speed of liquid crystals is related to the voltage. The higher the voltage is, the larger the deflection speed of liquid crystal molecules is.

2. The second method is to change the initial state of liquid crystal molecules. This is in fact to enable the liquid crystal molecules to be in an unstable state, so that the liquid crystal molecules can react immediately in response to a stimulus. This method can reduce response time but it cannot be used very freely because the liquid crystal molecules cannot be too unstable, otherwise it would be difficult to control them.

3. The third method is to reduce the viscosity of liquid crystal material. The thicker the liquid crystal material is, the harder it is to drive liquid crystal molecules. If the liquid crystal material is diluted, it becomes easier to drive the liquid crystal molecules to deflect, as a consequence of which the response time is rendered shorter. However, dilution of the liquid crystal material may affect its ability to control light. The response time is reduced, but the cost is high. The less viscous the liquid crystal material is, the lighter the color of images is; and as a result, details of the images become obscure and meanwhile there might be slight light leakage. This is also the reason why LG used grayscale technology merely in its super in-plane switching (S-IPS) panels.

Because of the disadvantages of the above method 2 and method 3, reduction of grayscale response time currently mainly relies on voltage increase, which method is referred to by panel manufacturers (i.e., AU Optronics) as overdrive (OD) technology.

Existing overdrive methods and modes are all based on LCD devices with an RBG three-color display system. It is therefore desirable to provide an improved overdrive system with respect to a four-color display system such as an RGBW/RGBY system.

At present, in a display device with an LCD panel or an organic light-emitting diode (OLED) panel, a pixel is mostly formed by a red (R) sub-pixel, a green (G) sub-pixel, and a blue (B) sub-pixel. By regulating the grayscale value of each sub-pixel and blending colors of the sub-pixels, desired colors are achieved to display color images. With the development of information technologies, people are requiring more of display panels on properties such as high light transmittance, low power consumption, and image quality. An existing display method by blending RGB three-primary colors of light performs low in light transmittance and blending efficiency. This leads to large power consumption of display panels, and thus is not conducive to product optimization of display panels. In view of this, it was proposed to form a pixel with four sub-pixels: a red (R) sub-pixel, a green (G) sub-pixel, a blue (B) sub-pixel, and a fourth sub-pixel, so as to improve the display quality of RGB display panels.

The additional fourth sub-pixel is usually a white (W) sub-pixel, and a pixel is formed by an R sub-pixel, a G sub-pixel, a B sub-pixel, and a W sub-pixel. A display device with an RGBW display panel has to convert inputted primary RGB data into RGBW data, so that the RGBW display panel can be driven to achieve display. Whereas according to existing methods by which primary RGB data is converted into RGBW data, sub-pixels in a pixel has to satisfy the relational expression W=R+G+B.

FIG. 1 is a transmittance spectrogram of a W sub-pixel according to the prior art. FIG. 2 is a transmittance spectrogram of R, G, B sub-pixels according to the prior art. Referring to FIGS. 1 and 2, in practice, it is hard to satisfy the relational expression W=R+G+B because backlight (e.g., blue light) produced by a backlight module travels directly through the W sub-pixel (which is usually made of a transparent photoresist) In addition, light emitted from the W sub-pixel is closely similar to light emitted from the B sub-pixel. Under this circumstance, if the RGBW display panel displays white, the light emitted from the W sub-pixel and the light emitted from the B sub-pixel may cause it incapable of covering a normal white spectrum scope, and further cause an unusual chromatic value of white.

SUMMARY OF THE INVENTION

The present disclosure provides an overdrive method of a four-color panel to remove an afterimage when there is a large R/G/B/W gray-scale difference between two adjacent frames.

The overdrive method of a four-color panel comprises steps of:

step 1, calculating R/G/B overdrive target values, wherein R is a red sub-pixel, G is a green sub-pixel, and B is a blue sub-pixel;

step 2, obtaining R/G/B overdrive target values between different gray-scales according to switching waveforms between different gray-scales;

step 3, calculating a W overdrive target value according to the R/G/B overdrive target values obtained in step 1, wherein W is a white sub-pixel;

step 4, obtaining W overdrive target values between different gray-scales according to the R/G/B overdrive target values between different gray-scales obtained in step 2 and a first formula, which is:

$$OW = \frac{\left[\frac{(dr)^2}{(dw)^2} + \frac{(dg)^2}{(dw)^2} + \frac{(db)^2}{(dw)^2}\right]}{3} * \left(\frac{OR + OG + OB}{3}\right); \quad (1)$$

step 5, adding calculation of difference of brightness normalized curve to calculation of an R/G/B overdrive table to obtain changed R/G/B overdrive target values; and step 6, substituting the changed R/G/B overdrive target values obtained in step 5 into the first formula to obtain a second formula:

$$OW = \frac{\left[\frac{(dr)^2}{(dw)^2} + \frac{(dg)^2}{(dw)^2} + \frac{(db)^2}{(dw)^2}\right]}{3} * \left(\frac{OR + OG + OB}{3}\right) * \text{factor}, \quad (2)$$

wherein the factor has a positive value.

The following beneficial effects can be brought about by the present disclosure. The overdrive method of a four-color panel comprises searching 10% brightness value point and 90% brightness value point in an R/G brightness normalized curve and calculating difference between R/B brightness normalized curve and G brightness normalized curve ranging from 10% brightness value point to 90% brightness value point. Each R/G overdrive gray-scale voltage value in an overdrive gray-scale voltage table is determined through evaluating a minimum value of the difference between brightness normalized curves.

According to the present disclosure, the technical problem of afterimage can be solved when there is a large R/G/B/W gray-scale difference between two adjacent frames, a brightness-response time curve with smaller gray-scale difference changes faster, and a brightness-response time curve with large gray-scale difference do not match that changes.

DETAILED DESCRIPTION OF THE EMBODIMENTS

Embodiment 1

Figure 5:
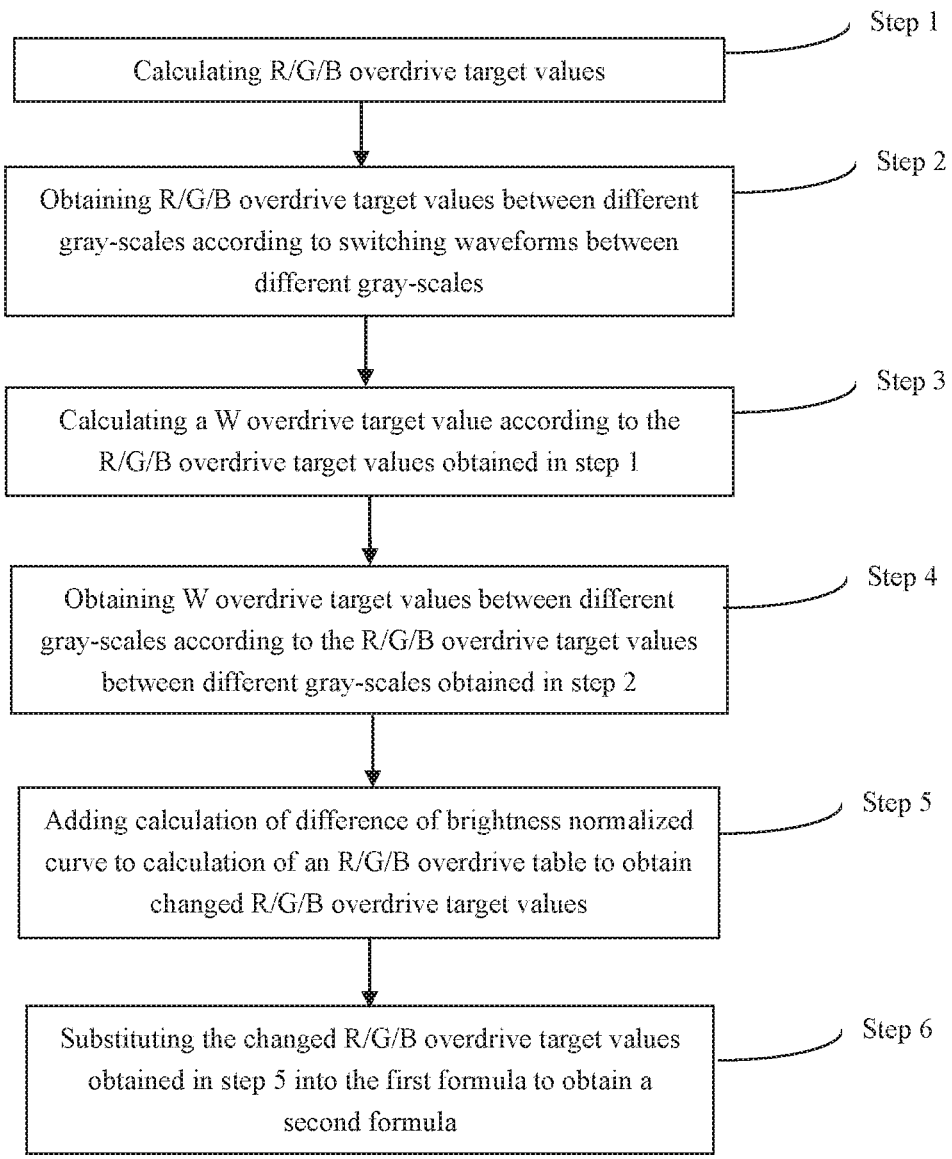
FIG. 5 is a flow chart of an overdrive method of a four-color panel according to the present disclosure.
Figure 6:
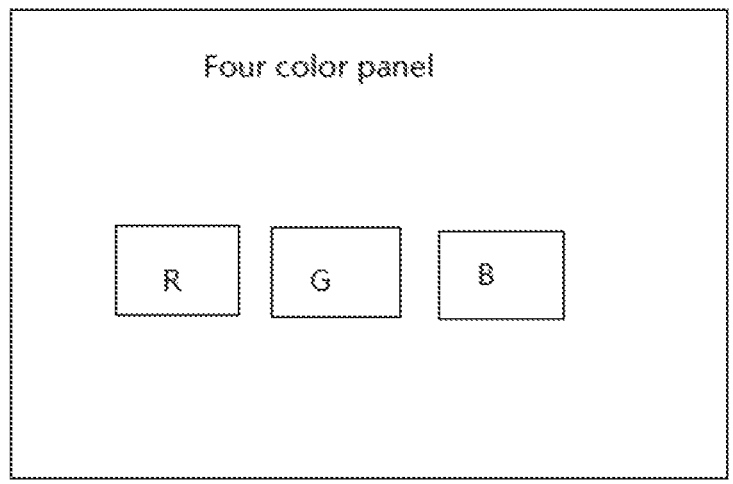
FIG. 6 is a block diagram of the four color panel and pixels of the four color panel.

As shown in FIG. 5, an overdrive method of a four-color panel comprises the following steps.

In a four-color display device, three-color signals are input, four-color signals are output, and thus a mapping process is performed between the input and the output.

A group of input signals Ri, Gi, and Bi are processed via a three-color to four-color calculation in a first step and a white balance in a second step, and then output as Ro, Go, Bo, and Wo. Ri represents a gray-scale value of red color after a white balance process; Gi represents a gray-scale value of green color after a white balance process; and Bi represents a gray-scale value of blue color after a white balance process. Ro represents an output gray-scale value of red color of RGBW data to be displayed; Go represents an output gray-scale value of green color of RGBW data to be displayed; Bo represents an output gray-scale value of blue color of RGBW data to be displayed; and Wo represents an output gray-scale value of white color of RGBW data to be displayed.

When a four-color LCD needs an overdrive design due to the response time thereof a traditional three-color overdrive method cannot be used in a four-color system. One important reason lies in that, in the four-color system, there must be W/R/G/B four-color overdrive target values, rather than R/G/B three-color overdrive target values. If a mapping function is switched off, an overdrive target value of W sub-pixel, which is regulated through a gray-scale value of the W sub-pixel displayed alone which is controlled by a signal, differs from that regulated when the mapping function is switched on, because thin film transistors (TFT) have different loads and charge and discharge conditions. Meanwhile, in order to realize a gray-scale switching when W sub-pixel is displayed alone, a complex software is needed.

In step 1, R/G/B overdrive target values are calculated, wherein R is a red sub-pixel, G is a green sub-pixel, and B is a blue sub-pixel.

In step 2, R/G/B overdrive target values between different gray-scales are obtained according to switching waveforms between different gray-scales.

When an image is switched from frame n to frame n+1, an additional driving voltage OD(w) is needed in a four-color system. When RGB to RGBW mapping function is switched on, the overdrive target values between different gray-scales can be obtained through gray-scale switching waveforms of single-color R/G/B image.

In step 3, a W overdrive target value is calculated according to the R/G/B overdrive target values obtained in step 1, wherein W is a white sub-pixel.

With respect to the W sub-pixel, when the mapping function is switched on, the four-color display system cannot display alone a single-color image of a fourth sub-pixel, because the gray-scale value of the fourth sub-pixel depends on input R/G/B signals.

Considering a WRGB cell structure, in the cell structure of a four-color pixel system, a cell gap of the red sub-pixel is close to that of the green sub-pixel, and a cell gap of the white sub-pixel is the same as that of the blue sub-pixel. In this case, the W overdrive target value can be calculated based on analysis on deflection speed of liquid crystals in the cell and the R/G/B overdrive target values.

In step 4, W overdrive target values between different gray-scales are obtained according to the R/G/B overdrive target values between different gray-scales obtained in step 2.

Testing R/G/B/W film thicknesses, and obtaining a relationship between W film thickness dw and R/G/B film thickness dr/dg/db through the test. Thus, for each same overdrive target value, the W sub-pixel overdrive target values between different gray-scales can be obtained through R/G/B overdrive target values. It is assumed that, from Gray 1 to Gray 2, the R/G/B overdrive target values are respectively OR1, OG1, and OB1, then:

$$OW = \frac{\left[\frac{(dr)^2}{(dw)^2} + \frac{(dg)^2}{(dw)^2} + \frac{(db)^2}{(dw)^2}\right]}{3} * \left(\frac{OR + OG + OB}{3}\right) \quad (1)$$

Based on above formula (1), the W overdrive target values can be obtained through R/G/B overdrive target values. However, as to overdrive values of W sub-pixel, some amendments should be made. The switching from Gray 1 to Gray 2 is shown in Table 1.

TABLE 1

|   | Frame n | Frame n + 1 | ΔGray |
|---|---------|-------------|-------|
| R | r1 | r2 | \|r2 − r1\| |
| G | g1 | g2 | \|g2 − g1\| |
| B | b1 | b2 | \|b2 − b1\| |
| W | w1 | w2 | \|w2 − w1\| |

As shown in Table 1, Frame n is an $n^{th}$ frame image; Frame n+1 is an $(n+1)^{th}$ frame image; Δ Gray is gray difference; r1, g1, b1, and w1 are respectively gray-scale values of red sub-pixel, green sub-pixel, blue sub-pixel, and white sub-pixel of the $n^{th}$ frame image; and r2, g2, b2, and w2 are respectively gray-scale values of red sub-pixel, green sub-pixel, blue sub-pixel, and white sub-pixel of the $(n+1)^{th}$ frame image.

In step 5, calculation of difference of brightness normalized curve is added to calculation of an R/G/B overdrive table to obtain changed R/G/B overdrive target values.

In step 6, the changed R/G/B overdrive target values obtained in step 5 are substituted into the first formula to obtain a second formula.

The changed R/G/B overdrive target values obtained in step 5 are substituted into the formula in step 4. In order to solve the problem that a single brightness-response time curve of W sub-pixel cannot be obtained, and since the difference w2−w1 is likely to be influenced by R/G/B, a second formula (2) can be obtained based on the first formula (1).

$$OW = \frac{\left[\frac{(dr)^2}{(dw)^2} + \frac{(dg)^2}{(dw)^2} + \frac{(db)^2}{(dw)^2}\right]}{3} * \left(\frac{OR + OG + OB}{3}\right) * \text{factor} \quad (2)$$

wherein the factor has a positive value.

Embodiment 2

The present embodiment differs from embodiment 1 as follows.

In step 11, dynamic switching is performed among four frames, which includes a first to a fourth frames, according to a starting gray-scale and an ending gray-scale of a selected chart of an overdrive table to be completed.

In step 12, an overdrive target value is tried in order to obtain an R/G/B brightness-response time curve corresponding to the overdrive target value.

In step 13, the R/G/B brightness-response time curve obtained in step 12 is subjected to a noise reduction and smoothening treatment.

In step 14, a brightness value of the third frame of step 11 is taken as target brightness and whether the R/G/B brightness-response time curve obtained according to the overdrive target value of the trial shows brightness that matches the target brightness is determined, and if yes, going to step 15, otherwise repeating steps 12-14.

In step 15, if the brightness of the R/G/B brightness-response time curve corresponding to the overdrive target value of the trial is the first brightness that matches the target brightness, the overdrive target value of the trial is filled in a corresponding position in the overdrive table to be completed and repeating steps 12-14; and if the brightness of the R/G/B brightness-response time curve corresponding to the overdrive target value of the trial is not first brightness that matches the target brightness, response time of the R/G/B brightness-response time curve obtained according to the overdrive target value of the trial is compared to response time of the R/G/B brightness-response time curve obtained according to an overdrive target value set in a corresponding position in the overdrive table to be completed and going to step 16.

In step 16, if the response time of the R/G/B brightness-response time curve obtained according to the overdrive target value of the trial is less than the response time of the R/G/B brightness-response time curve obtained according to the overdrive target value set in the corresponding position in the overdrive table to be completed, the overdrive target value of the corresponding position in the overdrive table to be completed is replaced with the overdrive target value of the trial and repeating steps 12-15; if the response time of the R/G/B brightness-response time curve obtained according to the overdrive target value of the trial is greater than the response time of the R/G/B brightness-response time curve obtained according to the overdrive target value set in the corresponding position in the overdrive table to be completed, the overdrive target value of the corresponding position in the overdrive table to be completed is set to be finally determined overdrive target value and going to step 17.

In step 17, steps 11-16 are repeated until calculation of all overdrive target values of the overdrive table are completed.

Other steps and parameters are the same as those in embodiment 1.

Embodiment 3

The present embodiment differs from embodiment 1 or 2 as follows. Based on sequence of repeating, the overdrive target values are tried in step 12 in a sequence from a smallest one to a largest one.

Other steps and parameters are the same as those in embodiment 1 or 2.

Embodiment 4

The present embodiment differs from one of embodiments 1 to 3 as follows. Based on sequence of repeating, the overdrive target values are tried in step 12 in a sequence from a largest one to a smallest one.

Other steps and parameters are the same as those in one of embodiments 1 to 3.

Embodiment 5

The present embodiment differs from one of embodiments 1 to 4 as follows. A median filter is used to perform noise reduction and smoothening treatment on the R/G/B brightness-response time curve obtained in step 12.

Other steps and parameters are the same as those in one of embodiments 1 to 4.

Embodiment 6

The present embodiment differs from one of embodiments 1 to 5 as follows. In step 2 of obtaining R/G/B overdrive target values between different gray-scales, three-color signals R/G/B are input, and four-color signals R/G/B/W are output in a mapping state.

Other steps and parameters are the same as those in one of embodiments 1 to 5.

Embodiment 7

The present embodiment differs from one of embodiments 1 to 6 as follows. Calculation of the W overdrive target value in step 3 is performed in a mapping state.

Other steps and parameters are the same as those in one of embodiments 1 to 6.

Embodiment 8

The present embodiment differs from one of embodiments 1 to 7 as follows. The overdrive table in step 5 is a 17*17 overdrive table.

Other steps and parameters are the same as those in one of embodiments 1 to 7.

Embodiment 9

The present embodiment differs from one of embodiments 1 to 8 as follows. Step 5 of adding calculation of difference of brightness normalized curve to calculation of an R/G/B overdrive table to obtain changed R/G/B overdrive target values comprises following sub steps.

When there is a large R/G/B/W gray-scale difference between two adjacent frames, a brightness-response time curve with smaller gray-scale difference changes faster, and a brightness-response time curve with large gray-scale difference do not match that changes, which thus causes a technical problem of afterimage.

Therefore, there is a need to add calculation of difference of brightness normalized curve to calculation of R/G/B overdrive target values to solve this technical problem.

Figure 1:
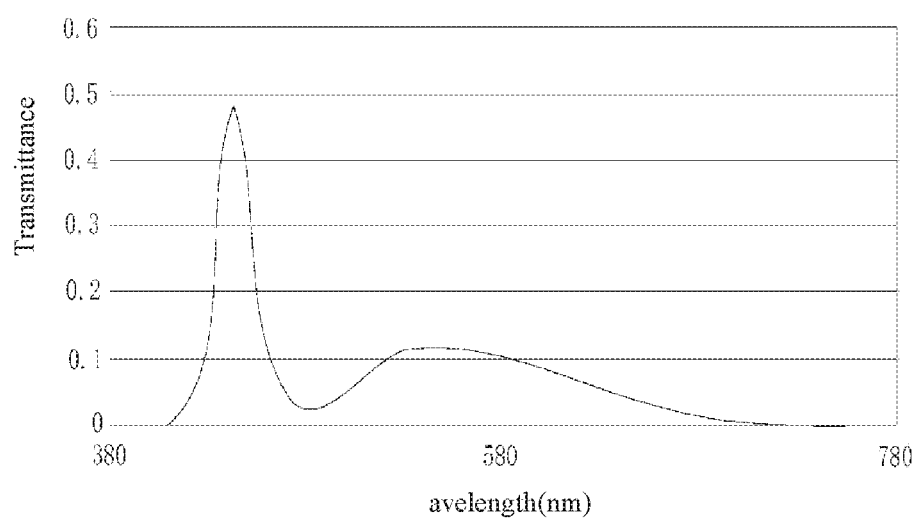
FIG. 1 is a transmittance spectrogram of a W sub-pixel according to the prior art.
Figure 2:
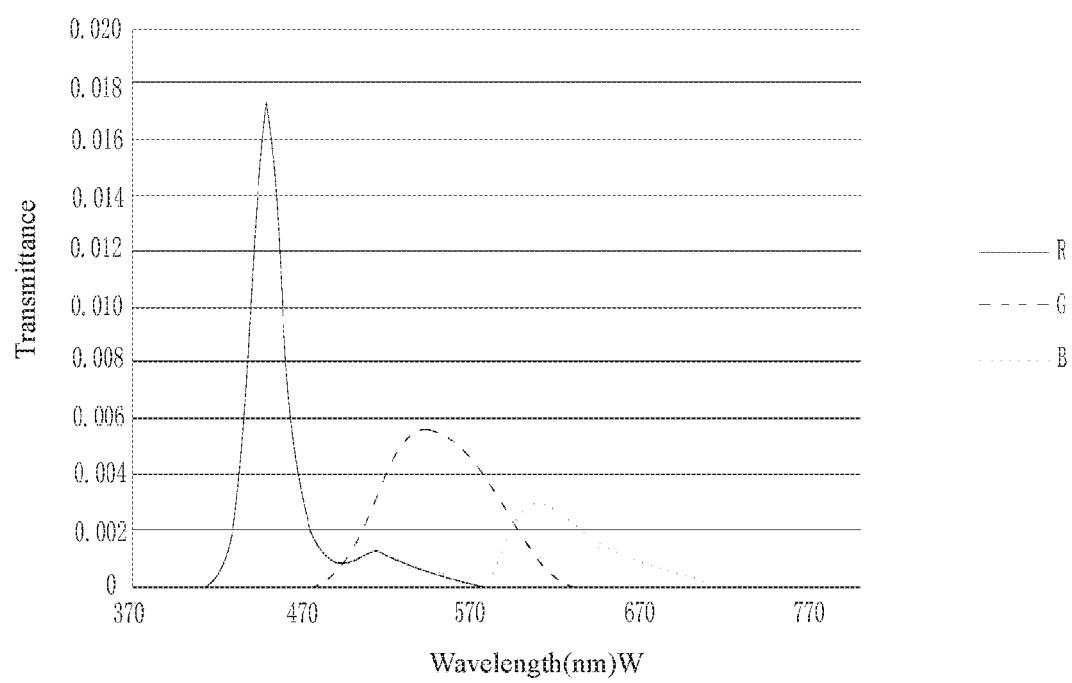
FIG. 2 is a transmittance spectrogram of R, G and B sub-pixels according to the prior art.
Figure 3:
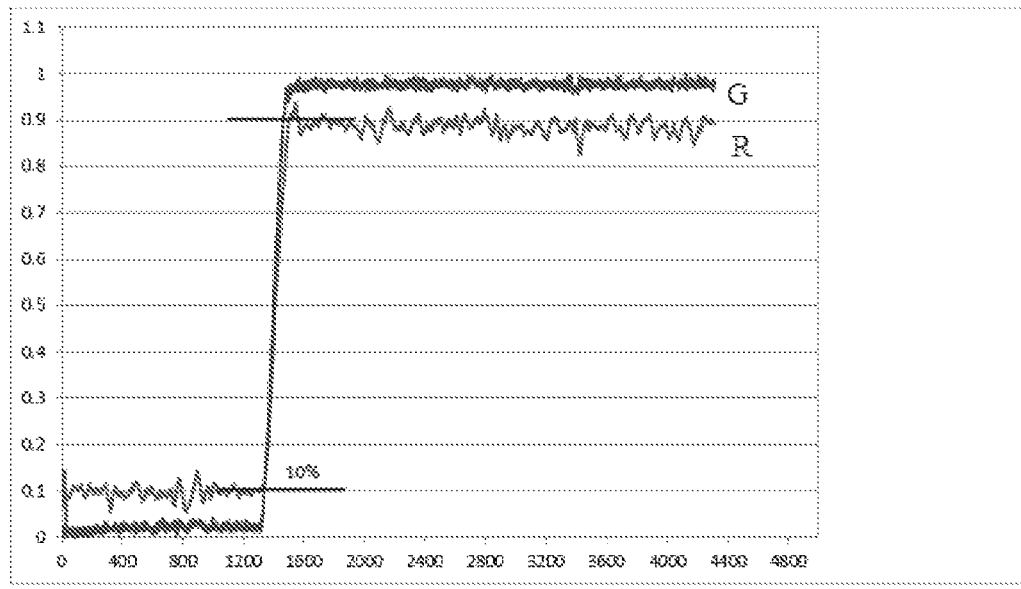
FIG. 3 schematically shows R/G brightness normalized curves (an initial frame-an overdrive frame-a target frame) from different starting positions.

Step 51, searching 10% brightness value point and 90% brightness value point in a normalized curve, as shown in FIG. 3; and Step 52, calculating difference between R (or B) brightness normalized curve and G brightness normalized curve ranging from 10% brightness value point to 90% brightness value point thereof:

deltaL=(Lv(R)−Lv(G))^2, wherein Lv(R) is R brightness, Lv(G) is G brightness, and each R/G overdrive gray-scale voltage value in an overdrive gray-scale voltage table is determined through evaluating a minimum value of the difference between brightness normalized curves.

Other steps and parameters are the same as those in one of embodiments 1 to 8.

Embodiment 10

The present embodiment differs from one of embodiments 1 to 9 as follows. The factor in step 6 fluctuates around integer 1.

As to different high gray-scale and low gray-scale regions, the positive factor can fluctuate around integer 1, so as to match different mapping functions F.

Other steps and parameters are the same as those in one of embodiments 1 to 9.

Figure 4:
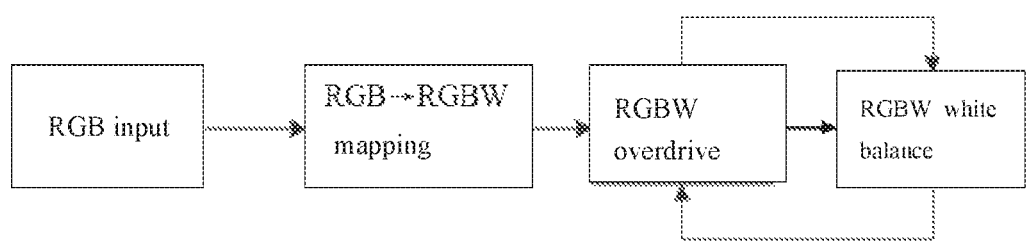
FIG. 4 is a signal processing diagram.

FIG. 4 is a signal processing diagram of a four-color display system, in which the sequence of the white balance module and the overdrive module can be exchanged, and calculation and debugging of the overdrive target values are not affected.

The embodiments are merely examples of the principles and applications of the present disclosure. Hence, it can be understood that, numerous modifications can be made to the embodiments, and other arrangements can be made, as long as they do not go beyond the spirit and scope of the present disclosure as defined by the appended claims. It can be understood that, different dependent claims and features described herein can be combined in a manner different from those described in the initial claims. It can also be understood that, the technical features described in one embodiment can also be used in other embodiments.

The invention claimed is:

1. An overdrive method of a four-color panel, comprising steps of:
  step 1, calculating R/G/B overdrive target values of pixels of the four-color panel, wherein R is a red sub-pixel of the four-color panel, G is a green sub-pixel of the four-color panel, and B is a blue sub-pixel of the four-color panel;
  step 2, obtaining R/G/B overdrive target values of the pixels of the four-color panel between different gray-scales according to switching waveforms between different gray-scales;
  step 3, calculating a W overdrive target value of the pixels of the four-color panel according to the R/G/B overdrive target values of the pixels of the four-color panel obtained in step 1, wherein W is a white sub-pixel of the four-color panel;
  step 4, obtaining W overdrive target values of the pixels of the four-color panel between different gray-scales according to the R/G/B overdrive target values of the pixels of the four-color panel between different gray-scales obtained in step 2 and a first formula, which is:

$$OW = \frac{\left[\frac{(dr)^2}{(dw)^2} + \frac{(dg)^2}{(dw)^2} + \frac{(db)^2}{(dw)^2}\right]}{3} * \left(\frac{OR + OG + OB}{3}\right), \quad (1)$$

wherein dw is W film thickness, dr is R film thickness, dg is G film thickness, db is B film thickness, OR is an R overdrive target value between different gray-scales, OG is a G overdrive target value between different gray-scales, and OB is a B overdrive target value between different gray-scales;

step 5, adding calculation of difference of brightness normalized curves to calculation of an R/G/B overdrive table to obtain changed R/G/B overdrive target values of pixels of the four-color panel; and step 6, substituting the changed R/G/B overdrive target values of the pixels of the four-color panel obtained in step 5 into the first formula to obtain a second formula:

$$OW = \frac{\left[\frac{(dr)^2}{(dw)^2} + \frac{(dg)^2}{(dw)^2} + \frac{(db)^2}{(dw)^2}\right]}{3} * \left(\frac{OR+OG+OB}{3}\right) * \text{factor}, \quad (2)$$

wherein the factor has a positive value.

2. The method according to claim 1, wherein the calculating R/G/B overdrive target values of the pixels of the four-color panel in step 1 comprises sub steps of:

step 11, performing dynamic switching among four frames, which includes a first to a fourth frames, according to a starting gray-scale and an ending gray-scale of a selected chart of an overdrive table to be completed;

step 12, trying an overdrive target value of the pixels of the four-color panel in order to obtain an R/G/B brightness-response time curve corresponding to the overdrive target value of the pixels of the four-color panel;

step 13, subjecting the R/G/B brightness-response time curve obtained in step 12 to a noise reduction and smoothening treatment;

step 14, taking a brightness value of the third frame of step 11 as target brightness and determining whether the R/G/B brightness-response time curve obtained according to the overdrive target value of the trial shows brightness that matches the target brightness and if yes, going to step 15, otherwise repeating steps 12-14;

step 15, if the brightness of the R/G/B brightness-response time curve of the pixels of the four-color panel corresponding to the overdrive target value of the trial is the first brightness that matches the target brightness, filling the overdrive target value of the trail in a corresponding position in the overdrive table to be completed and repeating steps 12-14; and if the brightness of the R/G/B brightness-response time curve of the pixels of the four-color panel corresponding to the overdrive target value of the trial is not first brightness that matches the target brightness, comparing response time of the R/G/B brightness-response time curve obtained according to the overdrive target value of the trial to response time of the R/G/B brightness-response time curve obtained according to an overdrive target value set in a corresponding position in the overdrive table to be completed and going to step 16;

step 16, if the response time of the R/G/B brightness-response time curve obtained according to the overdrive target value of the trial is less than the response time of the R/G/B brightness-response time curve obtained according to the overdrive target value set in the corresponding position in the overdrive table to be completed, replacing the overdrive target value of the corresponding position in the overdrive table to be completed with the overdrive target value of the trial and repeating steps 12-15; if the response time of the R/G/B brightness-response time curve obtained according to the overdrive target value of the trial is greater than the response time of the R/G/B brightness-response time curve obtained according to the overdrive target value set in the corresponding position in the overdrive table to be completed, setting the overdrive target value of the corresponding position in the overdrive table to be completed to be finally determined overdrive target value and going to step 17; and step 17, repeating steps 11-16 until calculation of all overdrive target values of the overdrive table are completed.

3. The method according to claim 2, wherein based on sequence of repeating, the overdrive target values of the pixels of the four-color panel are tried in step 12 in a sequence from a smallest one to a largest one.

4. The method according to claim 3, wherein in step 13, a median filter is used to perform noise reduction and smoothening treatment on the R/G/B brightness-response time curve of the pixels of the four-color panel obtained in step 12.

5. The method according to claim 4, wherein in step 2 of obtaining R/G/B overdrive target values of the pixels of the four-color panel between different gray-scales, three-color signals R/G/B are input, and four-color signals R/G/B/W are output in a mapping state.

6. The method according to claim 3, wherein in step 2 of obtaining R/G/B overdrive target values of the pixels of the four-color panel between different gray-scales, three-color signals R/G/B are input, and four-color signals R/G/B/W are output in a mapping state.

7. The method according to claim 6, wherein calculation of the W overdrive target value of the pixels of the four-color panel in step 3 is performed in a mapping state.

8. The method according to claim 2, wherein based on sequence of repeating, the overdrive target values of the pixels of the four-color panel are tried in step 12 in a sequence from a largest one to a smallest one.

9. The method according to claim 8, wherein in step 13, a median filter is used to perform noise reduction and smoothening treatment on the R/G/B brightness-response time curve of the pixels of the four-color panel obtained in step 12.

10. The method according to claim 9, wherein in step 2 of obtaining R/G/B overdrive target values of the pixels of the four-color panel between different gray-scales, three-color signals R/G/B are input, and four-color signals R/G/B/W are output in a mapping state.

11. The method according to claim 10, wherein calculation of the W overdrive target value of the pixels of the four-color panel in step 3 is performed in a mapping state.

12. The method according to claim 11, wherein the overdrive table of the pixels of the four-color panel in step 5 is a 17*17 overdrive table.

13. The method according to claim 12, wherein step 5 of adding calculation of difference of brightness normalized curves to calculation of an R/G/B overdrive table of the pixels of the four-color panel to obtain changed R/G/B overdrive target values comprises sub steps of:

step 51, searching 10% brightness value point and 90% brightness value point in a normalized curve; and step 52, calculating difference between R (or B) brightness normalized curve and G brightness normalized curve ranging from 10% brightness value point to 90% brightness value point thereof:

$$\text{delta}L = (Lv(R) - Lv(G))^2,$$

wherein Lv(R) is R brightness, Lv(G) is G brightness, and each R/G overdrive gray-scale voltage value in an overdrive gray-scale voltage table is determined through evaluating a minimum value of the difference between brightness normalized curves.

14. The method according to claim 13, wherein the factor in step 6 fluctuates around integer 1.

15. The method according to claim 8, wherein in step 2 of obtaining R/G/B overdrive target values of the pixels of the four-color panel between different gray-scales, three-color signals R/G/B are input, and four-color signals R/G/B/W are output in a mapping state.

16. The method according to claim 15, wherein calculation of the W overdrive target value of the pixels of the four-color panel in step 3 is performed in a mapping state.

17. The method according to claim 2, wherein in step 2 of obtaining R/G/B overdrive target values of the pixels of the four-color panel between different gray-scales, three-color signals R/G/B are input, and four-color signals R/G/B/W are output in a mapping state.

18. The method according to claim 17, wherein calculation of the W overdrive target value of the pixels of the four-color panel in step 3 is performed in a mapping state.

19. The method according to claim 1, wherein in step 2 of obtaining R/G/B overdrive target values of the pixels of the four-color panel between different gray-scales, three-color signals R/G/B are input, and four-color signals R/G/B/W are output in a mapping state.

20. The method according to claim 19, wherein calculation of the W overdrive target value of the pixels of the four-color panel in step 3 is performed in a mapping state.

* * * * *